Feb. 7, 1950        F. L. MOSELEY        2,496,809
RADIO CONTROLLED PILOT SYSTEM
Original Filed Feb. 10, 1941        4 Sheets-Sheet 1
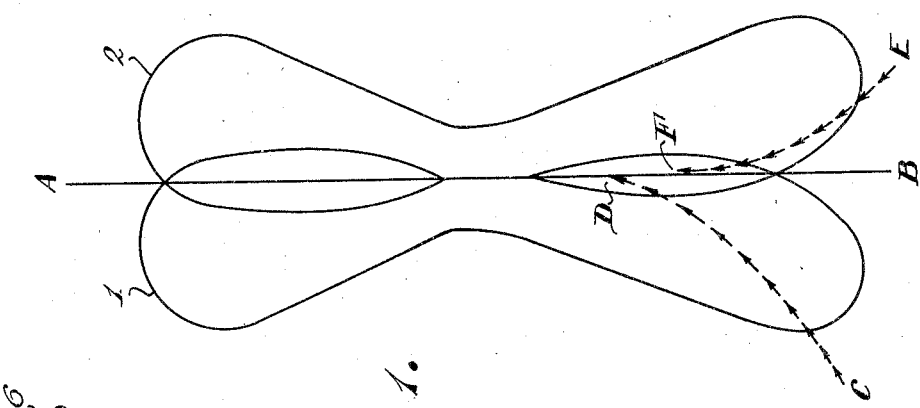
Fig. 1.
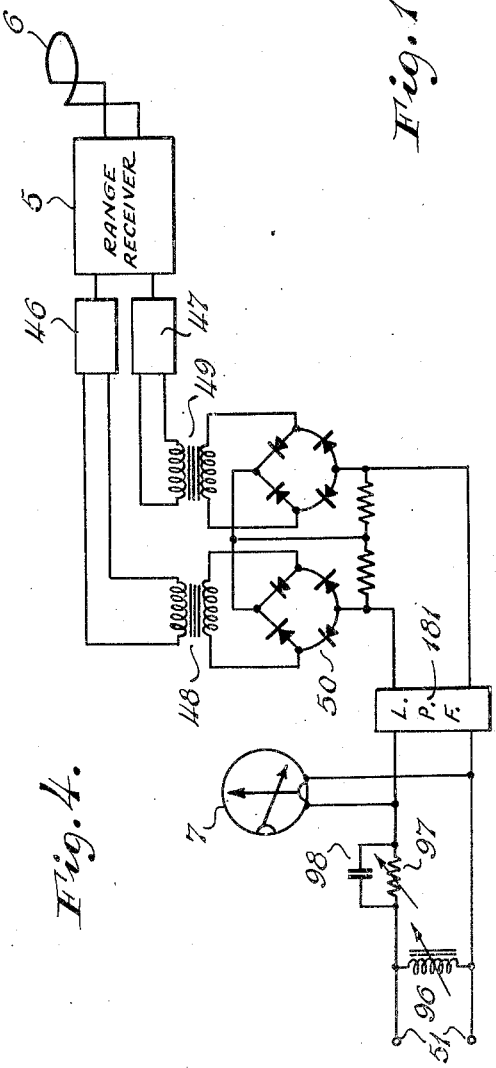
Fig. 4.
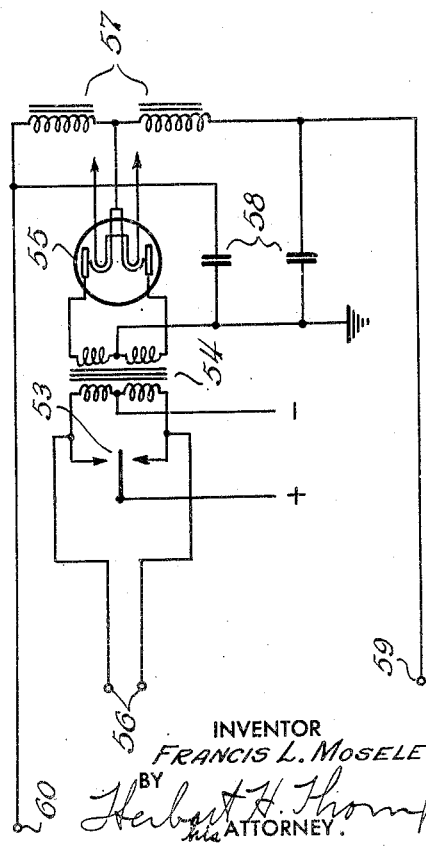
INVENTOR
FRANCIS L. MOSELEY
BY
Herbert H. Thompson
his ATTORNEY.

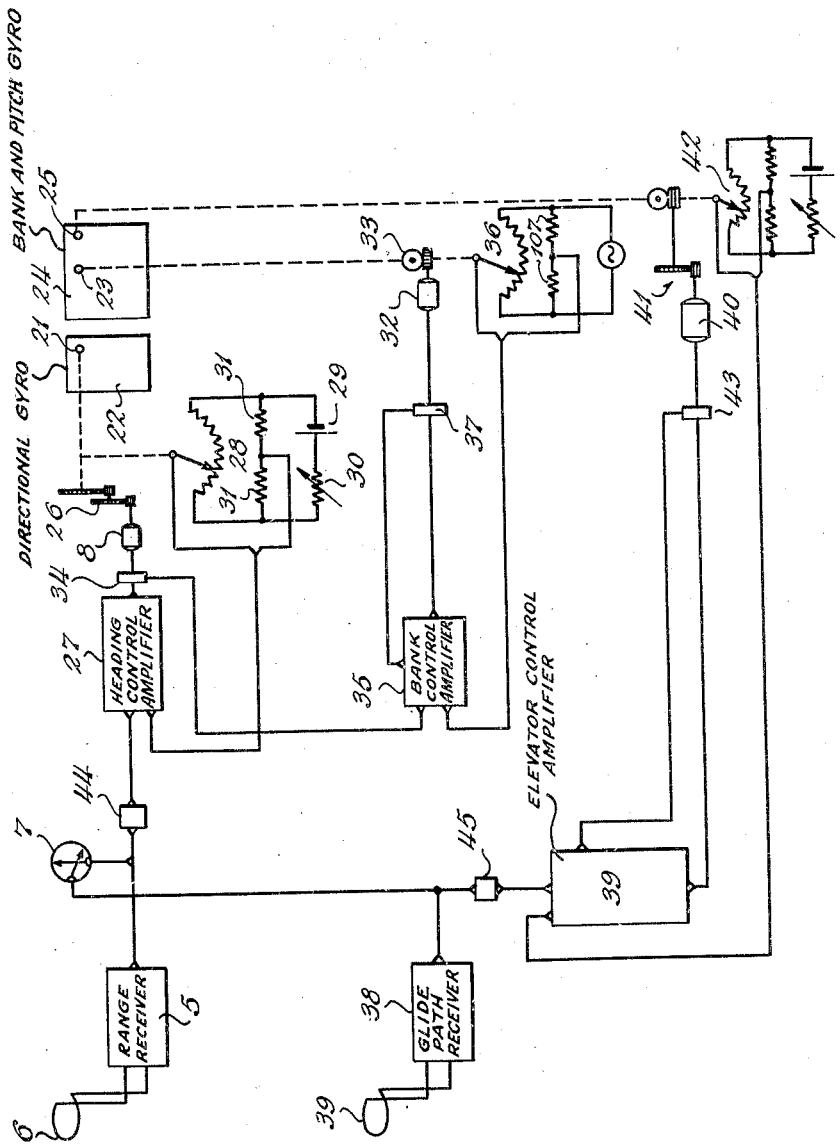

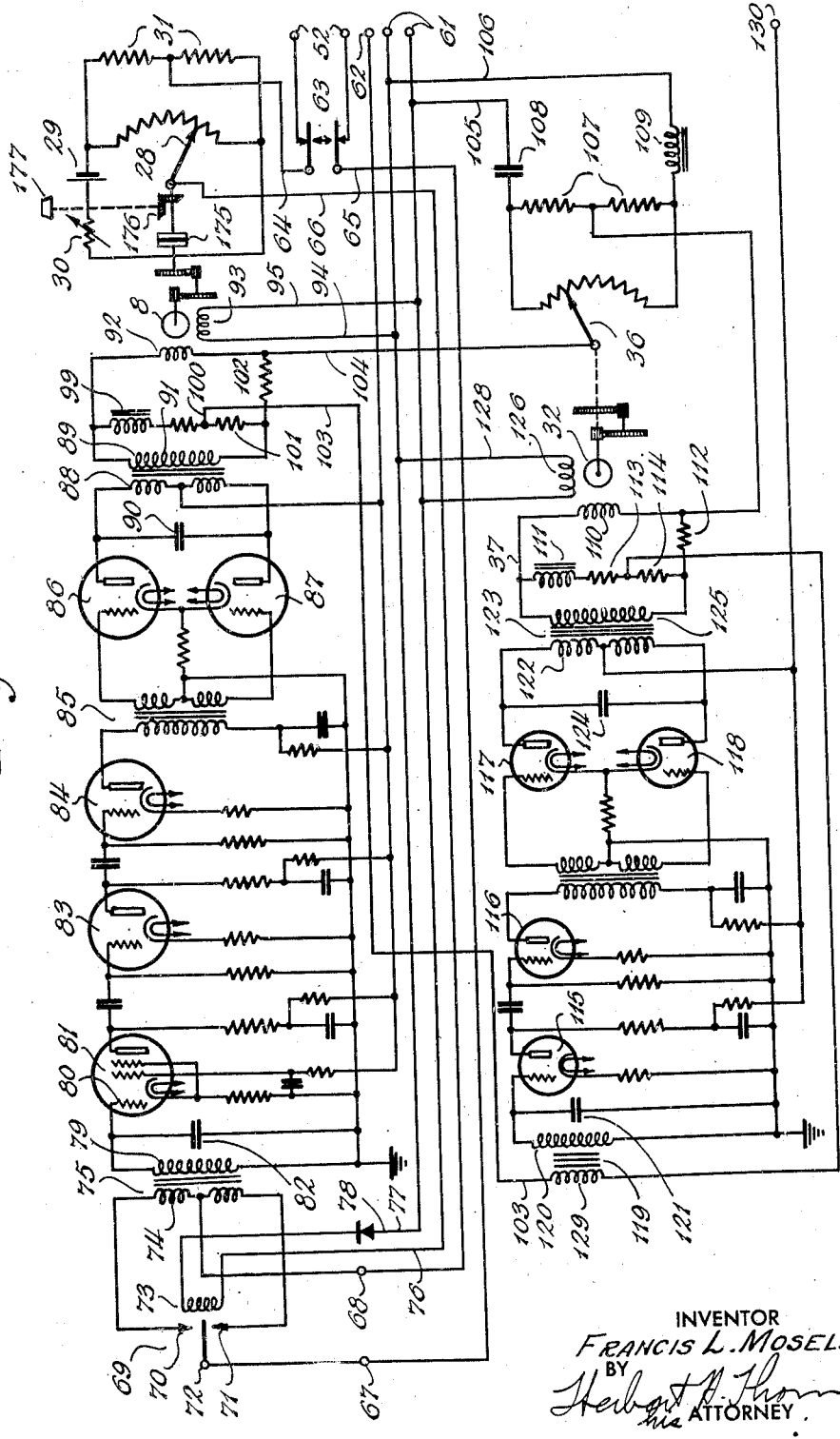

Feb. 7, 1950     F. L. MOSELEY     2,496,809
RADIO CONTROLLED PILOT SYSTEM
Original Filed Feb. 10, 1941     4 Sheets-Sheet 4
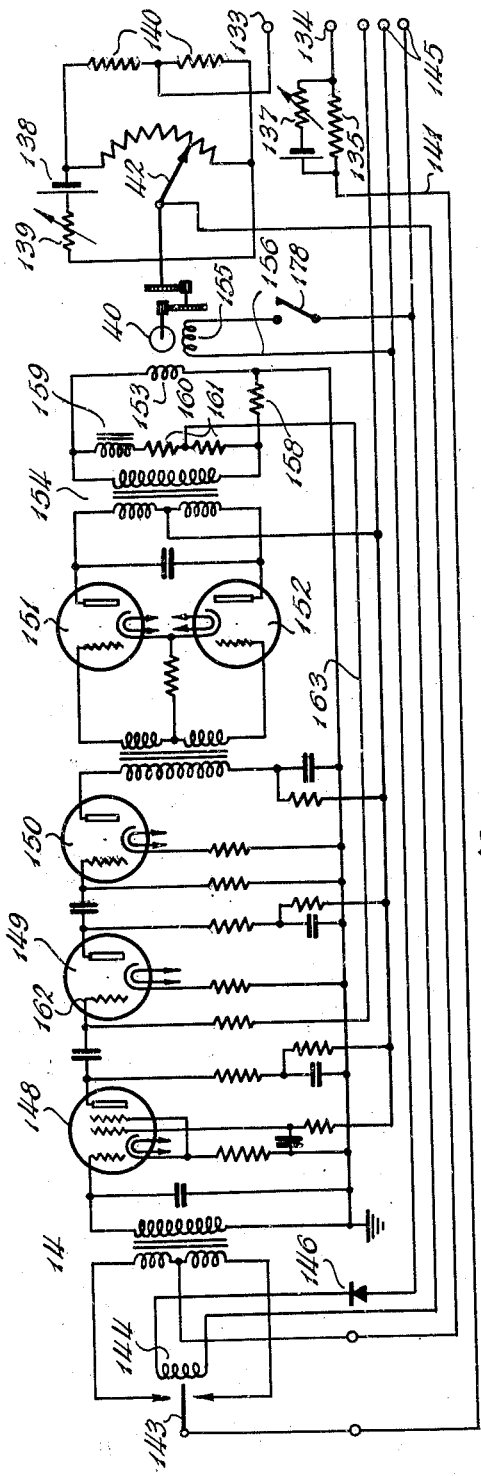
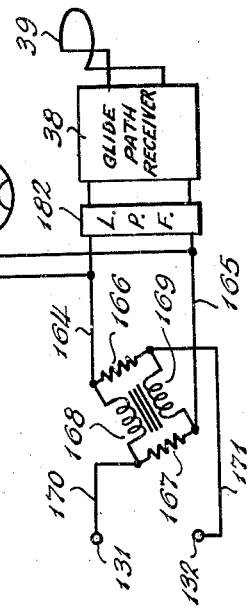
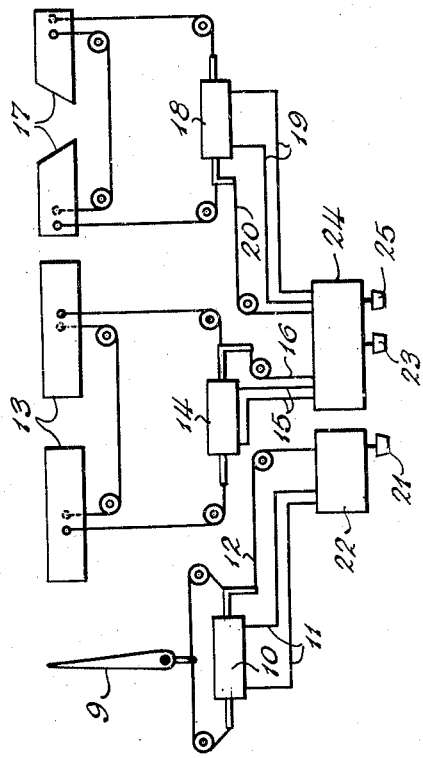
INVENTOR
FRANCIS L. MOSELEY
BY
Herbert H. Thompson
his ATTORNEY Patented Feb. 7, 1950

2,496,809

UNITED STATES PATENT OFFICE 2,496,809

RADIO CONTROLLED PILOT SYSTEM

Francis L. Moseley, Osborn, Ohio, assignor to The Sperry Corporation, a corporation of Delaware Original application February 10, 1941, Serial No. 378,296. Divided and this application October 12, 1943, Serial No. 505,917

24 Claims. (Cl. 244—77)

The present invention relates to the automatic control of aircraft, and particularly to the control of aircraft by signals received from suitable remote radio stations located on the ground. The present application is a division of application Serial No. 378,296, filed February 10, 1941, for Radio controlled pilot system, now Patent 2,423,336.

It has heretofore been proposed to utilize positional signals transmitted by radio stations for operating a position indicator located in an aircraft to give a pilot a visual indication of his position. Such signals are produced at the present time by means of doubly modulated transmitters which define a plane of equal modulation. It is also known to utilize a radio transmitter provided with a suitable antenna setting up a radiation pattern having a constant potential along a line suitable for employment as a glide path registering through an indicator to guide a pilot in the landing of the aircraft. It has further been proposed to employ a receiving loop stabilized in azimuth on the aircraft to define a course relative to a non-directional transmitter.

Any of the above or other radio transmission systems in conjunction with suitable receivers, registering in the aircraft signals varying with the position of the aircraft in space, is suitable for use in connection with the invention. I employ the positional data derived from the radio signals to steer the aircraft automatically, without the agency of the pilot, on a flight path coincident with the predetermined radio-defined course. The invention automatically corrects departures of the aircraft from the predetermined course by suitably correcting the direction of the aircraft for returning the aircraft to the course.

It will therefore be understood that the primary object of this invention is to automatically steer an aircraft on a flight path coincident with a predetermined course defined by positional radio signals.

A further object of the present invention is to provide novel automatic navigation equipment for aircraft wherein the heading response of the aircraft is dependent upon the actual departure of the aircraft from course together with the rate of change of this departure with respect to time, a suitable follow-back means being provided for bringing the steering control means to null position upon the resumption of the desired course by the craft.

Another object of the present invention is to provide automatic banking for aircraft wherein the amount of bank is dependent upon at least one derivative of any change of heading with respect to time.

A still further object of the present invention is to provide a novel banking control for aircraft which is responsive to the rate of turn of the craft and the speed of the bank-controlling motor, as modified by a follow-back proportional to the bank of the aircraft.

A still further object of the present invention is to provide novel bridge means for taking derivative voltages for use in controlling aircraft operation.

A further object of the present invention is to provide a novel method of navigating aircraft, comprising effecting lateral steering responsive to radio signals indicative of departure from course and rate of change of departure from course and vertical steering responsive to departure from course, rate of change of departure from course, and rate of speed of the elevator control motor.

A further object of the present invention is to provide a novel automatic navigational system wherein hunting of the aircraft about its line of flight is substantially eliminated through use of novel rate circuits.

A still further object of the present invention is to automatically steer an aircraft through use of radio-responsive control means operating automatic pilot means in the aircraft.

In carrying out these objects I provide a motor for controlling the direction of the aircraft. This motor is controlled by a positional signal obtained from a radio receiver which varies in amplitude according to the amount of departure of the aircraft from course. Normally this will be a small DC voltage, and in my system this positional signal is opposed by a follow-up signal which measures the directional correction through which the aircraft is turned under operation of the motor. When the directional correction is proportional to the departure, the two signals will be equal and opposite and the motor will come to rest.

The positional signal obtained from the radio receiver is of the order of a few microvolts and requires great amplification in order to obtain proper actuation of the motor. In order to avoid the difficulties inherent in direct current amplification, I convert the D. C. control signals proportional to the departure of the aircraft from course and to the directional correction under operation of the motor to A. C. previous to amplification. If desired, the follow-up signal may be introduced after conversion of the positional signal, in which case it will be supplied as an A. C. voltage inverse in phase to the converted positional signal.

I prefer to employ a two phase alternative current motor in which one field coil is energized by a local A. C. supply. The conversion of the D. C. signals to A. C. is carried out under control of the A. C. supply so that the amplified signal will have the same frequency as the A. C. supply, and I provide means for causing the amplified signal to lead or lag the A. C. supply by 90°. The amplified signal is supplied to the other field coil of the motor. The phase inversion of the amplified signal is dependent upon the polarity of the original D. C. signal and will operate to control the direction of the motor.

As used in connection with a doubly modulated transmission system, the radio receiver output is constituted by two alternating current signals of different frequencies. These signals are separately rectified and the resulting D. C. potentials bucked against each other to produce a resultant D. C. signal proportional to the difference between the original A. C. signals.

Control systems operating as described may be employed for correcting lateral departures of the aircraft from a course by controlling the heading, and for correcting vertical departures from course by controlling the angle of climb or descent particularly for landing operations. According to the invention a complete system will preferably be provided for controlling the aircraft both horizontally and vertically.

The invention also contemplates automatically controlling the bank of the aircraft in dependency on the rate of turn.

In the specific embodiment to be described the heading and elevation control systems are separately responsive to different radio signals but under certain conditions where the aircraft is driven off course both horizontally and vertically may simultaneously operate to return the aircraft to course.

The inventive system will most conveniently be operated in conjunction with, and through the agency of, a suitable automatic pilot. Ordinarily such automatic pilot will be of the gyroscopic type and the radio responsive control motor may perform its function of correcting the direction of flight through one or more of the direction setting controls of the automatic pilot.

The operating principles of the invention, in regard to the horizontal control of the direction, are broadly applicable to dirigible craft, such as surface craft.

This invention will be further understood in reference to the drawings in which:

Fig. 1 illustrates the flight path of aircraft under my steering control device;

Fig. 2 represents a block diagram showing my invention applied to obtain complete automatic three-dimensional steering control of an aircraft;

Fig. 3 is a circuit diagram of my control device for the turn and bank controls of an aircraft;

Fig. 4 represents the signal and power supply circuits for the operating units shown in Fig. 3;

Fig. 5 is a circuit diagram of my elevator control device.

Fig. 6 represents the signal supply circuit of the operating unit shown in Fig. 5; and, Fig. 7 is a diagrammatic representation of the operating relationship between an automatic pilot and the control surfaces of an aircraft.

As shown in Fig. 1, the line AB represents in a horizontal plane a course defined by positional radio signals. This course is produced in a known manner by the employment of doubly modulated radio transmitters to form radiation fields 1 and 2 of differing modulation frequencies. At the present time modulated frequencies of 90 and 150 cycles are employed. The two radiation fields define a vertical plane represented as course AB in which the field strength of the two radiation fields are equal. By suitable circuits responsive selectively to the different modulation frequencies used in connection with a radio receiver on an aircraft, it is possible to obtain a signal varying with the position of the aircraft relative to its departure from course AB.

In order to control the flight path of the aircraft so that it will coincide with the course AB, it is necessary to establish in the aircraft a compass base line parallel in direction to the course AB, and to control the flight path so that its deviation from the established base line heading varies proportionately to the departure from the course. Assuming an arbitrary departure, the flight path of an aircraft controlled in this manner is represented by the path CD, in which the arrows represent the heading of the aircraft as it passes over the flight path. It will be noted that the heading deviation is large under large departure, and becomes progressively smaller as the flight path approaches the course. The amount of correction in heading may be such as is required under operating conditions, and manifestly the proportionality need not be linear.

It has been found desirable in order to avoid hunting of the aircraft about the course to provide a further control of the air craft heading proportionate to its rate of change of position relative to the course. When this is applied in controlling the heading corrections of the plane in addition to the correction proportional to the departure itself, the flight path of the aircraft under control of my invention is represented by a path EF of Fig. 1. It will be noted that because of the velocity of the aircraft in its return to the course it has been caused to assume a heading parallel to the course just previous to reaching the same. This permits the aircraft to attain an exact "on course" position through its crosswise momentum, so that the aircraft does not overshoot the course. It will be noted that in the flight path CD the aircraft reached its "on course" position with a slight cross-course velocity which would cause the flight path to overshoot the course by a slight amount. Whereas the departure resulting from overshooting the course would be immediately corrected, the necessity for this is avoided by employing a control responsive to the rate of change of the departure.

By utilizing a steering control responsive to the rate of change of departure, it is also possible to obtain an accelerated correction of heading when the aircraft suddenly departs from course because of conditions encountered in flight. Because of the relatively large heading correction in response to a quick departure, the amount of the departure is therefore minimized.

It will be understood that under operating circumstances wherein the flight path includes a drift component transverse to the direction of the aircraft caused by side winds, the direction of flight of the aircraft cannot be directly controlled itself because the drift component depends on the magnitude of side winds which are not accurately determinable. The flight path, however, is variable in dependency on the change of direction of the aircraft, and consequently the desired flight path may in general be attained through the described directional corrections turning the aircraft toward course. The rate of approach to the course depends on the angle through which the aircraft is turned toward course, and therefore will likewise vary in proportion to the extent of departure. The control means operating proportionally to the rate of change of departure operates to compensate for drift by increasing the directional correction of the aircraft in proportion to its velocity of drift when such drift opposes its return to course, and decreases the directional correction when the drift is toward course, thereby maintaining the desired direction of flight.

It will further be understood that the above principles of operation may be carried out with any suitable source of positional signal for the aircraft and are in no way dependent on the specific radio system described. The same principles apply to the control of an aircraft in a vertical plane in relation to a suitably arranged source of positional signals defining the desired course in respect to altitude. As a source of such a positional signal it is well known to employ either a transmitter setting up a radiation field having the desired course defined by a path of constant potential, or to use a doubly modulated system operating to define a positional signal varying with altitude. The directional corrections are applied in the vertical plane to return the aircraft to course.

The manner in which my invention functions to carry out the proper steering control procedure to maintain the flight path in coincidence with the desired course may be described in connection with Fig. 2. As shown therein, radio range receiver 5 is provided with antenna 6 for receiving the doubly modulated radiation field described above. This receiving system is well known, being utilized to operate the vertical needle of the cross-pointer instrument 7 for the purpose of giving the pilot a visual indication of his position relative to the course. The output of the range receiver is utilized to operate the heading control motor 8. This motor controls the direction of the aircraft in a horizontal plane through operation of the rudder. To obtain the desired actuation of the rudder under control of motor 8, I contemplate the use of an automatic pilot in the aircraft. In particular, it is convenient to employ a gyroscopic automatic pilot of the type described in Patent No. 1,992,970 of March 5, 1935, for Hydropneumatic automatic pilot.

This type of automatic pilot is well known in the art, but its operation is diagrammatically illustrated in Fig. 7. The function of the automatic pilot in normal operation is to maintain the orientation of the aircraft constant in space. This is accomplished under control of suitable gyroscopes described in the above noted patent which actuate through hydraulically operated motors the control surfaces of the aircraft. Thus, as shown in Fig. 7, rudder 9 is operated by motor 10 under fluid pressure received from oil pressure lines 11. In order to obtain proportionate operation of the rudder by the gyroscopic control mechanism, a follow-up connection 12 is also employed. Similarly, ailerons 13 are operated by motor 14 with oil pressure lines 15 and follow-up connection 16. Elevators 17 are similarly operated by motor 18 provided with oil pressure lines 19 and follow-up connection 20. The operating mechanism is described in detail in Patent No. 1,992,970.

The automatic pilot thus operates to control the orientation of the aircraft about the three principal axes simultaneously. Manual control means are normally provided for selecting the desired direction settings. Thus, heading control knob 21 is provided for the directional gyropilot unit 22 and is operative to vary the heading of the aircraft under the operation of the gyroscopic control mechanism. Similarly, bank control knob 23 of gyropilot or bank and pitch gyro 24 is operative to select the desired angle of bank for the aircraft through operation of the ailerons 13, and elevator control knob 25 is provided to select the desired angle of climb or descent of the aircraft.

As shown in Fig. 2, motor 8 is provided with reduction gearing 26 and is operatively connected to the heading control 21, so as to control the heading of the aircraft through the desired operation of the rudder. In order to obtain a sufficient output to operate the turn control motor 8, I provide turn control amplifier 27 for amplifying the output of the radio range receiver.

In order to obtain a heading correction proportional to the departure of the aircraft, it is necessary to proportion the operation of the turn control motor 8 to the amplitude of the positional signal from the radio range receiver. For this purpose it is convenient to employ a potentiometer 28 in the circuit shown with battery 29, adjustable resistance 30 and center tapped resistance 31. As shown, this potentiometer is operatively connected to turn motor 8 and functions to supply the turn control amplifier with a voltage proportional to the heading correction bucking the positional signal from the radio receiver. Under control of this circuit turn motor 8 operates to change the heading of the aircraft only until the follow-up bucking voltage becomes equal and opposite to the positional signal, and thereby effects a heading correction proportional to the departure.

Although my turn control mechanism would operate in itself to return the aircraft to the vertical plane of the desired course, better control is obtained by effecting rigid turns free from skid by banking the aircraft in proportion to the rate of turn. For this purpose bank control motor 32 is provided, and is operatively connected through gearing 33 to the bank control 23 of the automatic pilot. In order to obtain bank in proportion to the rate of turn, I provide a rate of turn measuring device comprising an inductance-resistance bridge 34 to be further described responsive to the speed of turn control motor 8. The output from the rate of turn measuring device is amplified in the bank control amplifier 35 to operate bank control motor 32. In order to obtain bank proportional to the rate of turn, it is necessary that the operation of bank control motor 32 be proportional to the rate of turn signal, and for this purpose I provide a potentiometer 36 similar in function to potentiometer 28. Potentiometer 36 is operatively connected to bank control motor 32 and supplies a follow-up signal proportional to the angle of bank bucking the rate of turn signal. The amplitude of the follow-up voltage increases in proportion to the operation of bank control motor 32 and therefore causes motor 32 to bank the plane proportionately to the rate of turn.

In order to prevent overrunning of the bank control motor, and consequent hunting of the aircraft about the correct angle of bank, rate of bank measuring device or resistance-inductance bridge 37 to be further described, is provided for measuring the speed of bank control motor 32. The rate of bank signal is introduced into the bank control amplifier to produce a positive braking action on bank control motor 32 as the input signal, determined by the combined rate of turn signal and bank control follow-up voltage, approaches zero. Through this means any tendency of the bank control motor to overrun the correct setting is automatically checked and hunting is avoided.

In order to obtain automatic control of the aircraft in a vertical plane, a glide path receiver 38 with antenna 39 is utilized. As is well known, this receiver supplies a positional signal for operating the horizontal needle of the cross-pointer instrument 7 in order to give the pilot a visual indication of his departure from course in altitude. I employ this signal to control the altitude of the aircraft by the operation of motor 40. Although the altitude control could be obtained through throttle operation, I prefer to use motor 40 to operate the elevator control 25 of the automatic pilot. For this purpose, motor 40 is provided with reduction gearing 41 and is operatively connected to the elevator control 25. Motor 40 is operated from the output of the glide path receiver 38 through elevator control amplifier 39.

In order to obtain a correction proportional to the departure in altitude, I provide follow-up potentiometer 42 operatively connected to motor 40 for supplying a follow-up voltage proportional to the vertical directional correction bucking the glide path receiver signal 38.

For the purpose of preventing overrunning of motor 40 and consequent hunting of the aircraft, I provide speed measuring device or bridge 43 to be further described to obtain a signal proportional to the speed of motor 40 which is introduced into the elevator control amplifier 39 so as to produce a positive braking action of elevator control motor 40 as the input signal from the combined glide path receiver signal and the follow-up voltage approaches zero.

In each case the steering motor is controlled by a signal measuring the displacement from the desired direction, and by a follow-up signal measuring the amount of directional correction as the orientation of the aircraft is changed by operation of the motor. When the correction is of an amount proportional to the deviation to be corrected, the signals are equal and opposite, and no further operation of the steering motor occurs until a further deviation takes place. Where desirable to prevent overrunning of the motor, its speed is measured, and if it is moving when the control signal and follow-up signal are equal, the speed signal positively brakes the motor to a stop.

In order to measure the rate of departure from course, a circuit component may be employed which is responsive to the rate of change of the positional signal and operates to superimpose on the signal a component proportional to its rate of change. Such a device is diagrammatically illustrated at 44 for the heading control to be further described in connection with Fig. 4 and at 45 for the elevator control to be further described in connection with Fig. 6. When the rate of change measuring circuit is employed, the directional corrections will be accelerated and increased in proportion to the rate of change of departure to prevent overshooting on return to course and to minimize departure.

It should be mentioned that the operation of the invention has been described in combination with commercially conventional receivers and flight control instruments. These operating units are available for my purposes in existing aircraft at the present time, and in such instances may be economically employed therewith, but it is clear that the operating principles of my system are independent of the particular units described, and that other means may be employed.

The operating circuits of my system will now be described.

The control circuits for the turn control motor are shown in Figs. 3 and 4. In Fig. 4 is diagrammatically illustrated radio range receiver 5 which is responsive to the doubly modulated radiation field illustrated in Fig. 1. The radio range receiver separates the two modulating frequencies and provides a dual output. The output signals constitute alternating currents of the respective modulations of the field pattern, and are proportional to their respective amplitudes at the location of the aircraft in space. The output signals are amplified by tuned amplifiers 46 and 47 which are coupled to a rectifier network 50 by transformers 48 and 49. As is well known, the rectifier network produces a direct current signal proportional to the relative strengths of the modulation frequencies of the field pattern, varying in sign in dependency on which modulating frequency predominates, and falling to zero where the field strengths are equal. In this way a signal is provided which gives information relative to the position of the aircraft in regard to the radio-defined course.

This signal is used to operate the vertical needle of the cross-pointer instrument 7 in a known manner, and in my system is utilized to provide the basic control for the turn motor 8. For this purpose, the signal from the rectifier network 50 is led to terminals 51 which are connectable with the signal input terminals 52 of the turn control amplifier as shown in Fig. 3. Low pass filter 181 is provided to remove residual components of the modulating frequencies which may be transmitted through the rectifier network.

As shown in Fig. 4, I also provide a power supply for the turn control motor comprising vibrator 53, transformer 54 and rectifier 55. This supplies an alternating current output to terminals 56, and, through choke coils 57 and condensers 58, direct current at terminals 59 and 60.

The alternating current supply from terminals 56 is connected to terminals 61 of the turn control amplifier, and the direct current from terminal 60 is connected to terminal 62. The power supply and amplifier are provided with a common ground circuit.

The turn signals from terminals 52 are connected through switch 63 to conductors 64 and 65. Conductor 64 is connected to conductor 66 through center tapped resistance 31 and potentiometer 28, the operation of which will be hereinafter described. Conductors 65 and 66 are connected to terminals 67 and 68 of vibrator 69. This vibrator comprises contact points 70 and 71, and vibrating blade 72 which is actuated by magnet coil 73. The output from the vibrator is fed to the center tapped primary 74 of transformer 75. The magnet coil of the vibrator is connected to the alternating current source through conductors 76 and 77 and half-wave rectifier 78. Consequently vibrator blade 72 is actuated by the resulting current pulses to produce an alternating current in transformer 75 of a frequency equal to the alternating current supply, and of an amplitude proportional to the direct current input to the vibrator. The vibrator constitutes in effect a modulator.

Transformer 75 is provided with secondary 79 which is connected to control grid 80 of the first turn amplifier tube 81. Condenser 82 is placed across the secondary of transformer 75 to improve the waveform of the alternating current generated by the vibrator.

The turn control amplifier constitutes a conventional system employing, in addition to the input tube 81, resistance coupled tubes 83 and 84 which feed through transformer 85 push-pull tubes 86 and 87. Tubes 86 and 87 are connected to the split primary 88 of output transformer 89. Primary 88 is shunted by condenser 90 to provide further improvement in the waveform.

The secondary 91 of transformer 89 couples the amplifier output to field coil 92 of the turn control motor 8.

Turn control motor 8 is also provided with field coil 93 which is fed through conductors 94 and 95 by the alternating current supply.

As shown, motor 8 constitutes a two-phase motor which is operated by the alternating current source and the alternating current generated by the vibrator from the direct current positional signal. It will be understood that due to the dependency of the actuating coil of the vibrator on the alternating current supply, the alternating current generated by the vibrator maintains a definite phase relation with the alternating current supply. It will also be understood that the alternating current generated by the vibrator will shift its phase by 180° in response to a reversal of direction of the direct current signal. The circuit constants of the turn control amplifier are so adjusted that the output thereof as nearly as possible leads or lags the alternating current by 90°. Consequently, motor 8 will operate in dependency on the direct current input to the vibrator, and will respond to a reversal in polarity thereof by a reversal in its direction of rotation.

Turn motor 8 is operatively connected to the heading control of the automatic pilot, as described in connection with Fig. 2. The operation of the heading control causes a heading variation of the aircraft which is directly proportional to the movement of the heading control.

Operation of the turn motor 8 actuates potentiometer 28 to set up a voltage between conductors 64 and 66 as the contact arm moves relative to the midpoint of the resistance element. The potentiometer is supplied with the desired voltage gradient by means of battery 29 and rheostat 30. The voltage set up by the potentiometer is in direct proportion to the actuation of the heading control, and consequently this voltage is a measure of the deviation in heading caused by operation of turn motor 8. It will therefore be understood that operation of turn motor 8 is inaugurated on the appearance of a positional signal at terminals 52 indicating a lateral departure of the aircraft from its course, and that the turn motor continues to operate to change the heading for returning the aircraft to course until the voltage set up by potentiometer 28 balances out the positional signal, that is, until the heading correction as measured by this voltage is equal to the departure as measured by the positional signal voltage at terminals 52. In this way the follow-up voltage from the potentiometer acts to proportion the heading correction of the aircraft to its departure from course, and thereby causes the aircraft to correct its departures by a flight path such as shown at CD in Fig. 1. The flight path for correcting departure is under control of the output from potentiometer 28 which is determined by the input voltage supplied thereto, and by the type of winding, which may be linear or non-linear as required. It will be understood that the heading correction is continuously diminished as the aircraft approaches course in accordance with the diminishing position signal at terminals 52.

Manual control of the aircraft may be obtained through my device by operation of switch 63 to short conductors 64 and 65, whereupon the control signal for the turn control motor is obtained from the follow-up potentiometer 28. The motor therefore runs to restore the system to balance, with zero input, and in so doing changes the heading of the aircraft.

To employ this action control knob 177 is provided connected to potentiometer 28 by gearing 176. Operation of knob 177 rotates potentiometer 28 relative to turn motor 8 by slippage of friction clutch 175. Motor 8 immediately responds to the output from the potentiometer circuit resulting from movement of the potentiometer from balance position, and operates to change the heading until the potentiometer is returned to balance.

The amount of heading change under manual control will be proportional to the rotation given control knob 177, and consequently the setting of the automatic pilot may be controlled hereby. This is particularly useful when employed in connection with the automatic bank control to be described below.

In order to obtain a heading correction proportional to the rate at which the aircraft is approaching or leaving the course, I may employ circuit means responsive to the rate of change of the positional signal. As shown in Fig. 4, these may comprise an inductance 96 shunting the receiver output, and resistor 97 and condenser 98 which are in parallel to each other and in series with the receiver output. If the direct current signal increases from a steady state, the reactance temporarily assumes a high resistance to the increasing current and therefore increases the output voltage proportionately beyond what it would be in the steady state. Simultaneously condenser 98 effectively shunts resistor 97 for the rising current and additionally increases the output to terminals 51. In effect, therefore, the rate responsive circuit superimposes on the receiver output a signal component proportional to a time derivative, i. e., its rate of change, and thereby increases the heading correction.

Similarly, in response to movement of the aircraft toward course the receiver output drops, and inductance 96 generates a shelf-induced current of reverse polarity which further reduces the voltage at terminals 51. At the same time a decreasing voltage is set up over resistance 97 and condenser 98 immediately producing a voltage further opposing the receiver output. In this way, a component proportional to the rate of decrease of the positional signal is superimposed thereupon, and the heading correction of the aircraft is decreased in dependency on the rate of approach to course.

In the input circuit shown, as the follow-up potentiometer and the positional signal source are in series, the rate responsive circuit components also superimpose a component of the circuit proportional to the rate of change of the potentiometer output.

The turn control motor operates under the basic control of a positional signal proportional to departure from course. The basic signal is transformed to an alternating current having the frequency of a locally generated A. C. supply, is amplified, and is utilized with the locally generated A. C. supply to actuate the turn control motor. The change of heading of the aircraft under operation of the turn control motor is also measured by a follow-up signal which opposes the positional signal. In the form shown, the follow-up signal is constituted by a D. C. voltage opposing a D. C. positional signal, and the polarity of the resulting voltage determines whether the amplified A. C. signal leads or lags the local generated A. C. supply.

In the embodiment shown wherein the positional signal is derived from a doubly modulated radiation system it first appears as two alternating currents of different frequencies which are transformed to an alternating current of the frequency of the locally generated A. C. supply through rectification to a single direct current signal which is then converted to A. C. under control of the locally generated A. C. supply.

Circuit components have also been shown for superimposing on the positional signal a component proportional to its rate of change.

It is desirable, in order to avoid side-slip of the aircraft, to bank the same in proportion to the rate of turn. It will be understood that under operation of the automatic pilot heading control the heading is changed by a constant amount for each revolution of turn motor 8. In order to determine the rate of turn of the aircraft, it is therefore convenient to measure the speed of turn control motor 8, and to bank the plane in proportion to the speed.

For this purpose I provide an inductance-resistance bridge comprising field coil 92 of the turn motor 8, and resistance 102 as one pair of arms, and inductance 99 and resistances 100 and 101 as the other pair. This bridge is balanced by rotating the motor manually to provide an input voltage for the turn control amplifier through operation of potentiometer 28, and the motor is then blocked in this position. The total value of resistances 100 and 101 is then adjusted until the phase angle of the voltage drop across these resistances is the same as the drop across resistance 102. The relative values of resistances 100 and 101 are then adjusted without changing their total value so that the voltage drop across resistance 101 is exactly equal and opposite to that developed across resistance 102. When the turn motor 8 is allowed to rotate, the inductance of field coil 92 will increase proportionately to the rotation, and an unbalance voltage proportional to its speed will be supplied to conductors 103 and 104. This speed signal will be of a frequency equal to the alternating current supply, of an amplitude proportional to the speed of the turn control motor 8, and will reverse its phase through 180° in dependency on reversal of turn motor 8. The speed signal constitutes a basic control for bank motor 32 which is operatively connected to the bank control of the automatic pilot and which thereby varies the bank of the aircraft.

The output of the turn motor speed bridge is connected in series with potentiometer 36 which receives an alternating current supply through conductors 105 and 106. The potentiometer 36 is shunted by center tapped resistor 107. Potentiometer 36 supplies an alternating follow-up signal of an amplitude proportional to the displacement of the potentiometer from its center position and undergoing a phase reversal of 180° as the potentiometer arm passes from one side to the other side of the center position. Consequently, the output of follow-up potentiometer 36 may be caused to oppose the output from the turn motor speed bridge by suitable phase shifting means inserted in its supply circuit. For this purpose I provide condenser 108 and inductance 109.

In order to prevent overrunning of the bank control motor 32, I provide means for measuring its speed, which becomes operative to supply an input control voltage for the bank motor to brake it, should it overrun the primary control signals constituted by the voltages from the turn control motor speed measuring device and the bank motor follow-up potentiometer. This is constituted by a speed responsive resistance-inductance bridge comprising field coil 110 of the bank control motor 32, inductance 111, resistance 112, and resistances 113 and 114. The output of this bridge and its operation provide a signal measuring the speed of the bank control motor similar to the speed measuring bridge for turn control motor 8.

The output of the bank motor speed measuring bridge is also proportional to the rate of change of the output of the bank control motor follow-up potentiometer circuit, and to the rate of change of bank caused by operation of the bank control motor.

The bank control amplifier is constituted by resistance coupled tubes 115 and 116, which feed push-pull tubes 117 and 118. Input transformer 119 is provided for the amplifier, and includes secondary 120 feeding the grid of the input tube 115 and shunted by condenser 121 to improve the A. C. waveform. The push-pull output tubes 117 and 118 feed center tapped primary 122 of output transformer 123 which is shunted by condenser 124 also to improve the A. C. waveform. Output transformer 123 is provided with secondary 125 for matching the impedance of field coil 110 of the bank control motor. This motor is also provided with field 126 excited by the local A. C. supply through conductors 127 and 128.

The primary 129 of input transformer 119 is included in the bank motor control circuit which comprises the turn control motor speed measuring bridge, the bank control motor follow-up potentiometer, and the bank control motor speed measuring bridge, all connected in series.

The bank control motor operates under a signal comprised of a component proportional to the speed of the turn control motor, a component proportional to the bank of the aircraft under operation of the turn control motor and bucking the turn motor speed component, and a third component proportional to the speed of the bank control motor bucking the resultant of the first two components.

The operation of the bank control motor speed measuring bridge is best considered in comparison to the operation of the bank control motor without the bridge. In such a circuit the bank control motor would respond to a signal measured by the difference in output between the turn control motor speed bridge and the bank control motor follow-up potentiometer. As the resultant signal varies the bank control motor would tend to overrun as balance is reached, due to its momentum. Overrunning is particularly objectionable because it would result in hunting about the proper bank angle as the operation of the bank control motor carries the bank follow-up potentiometer through the balancing position.

In order to prevent overrunning of the bank control motor through the position of zero signal resulting from the combined outputs of the bank follow-up potentiometer and the turn control motor speed measuring bridge, the bank control motor speed measuring bridge is employed. This produces a signal proportional to the speed of the bank control motor which operates to oppose the signal otherwise supplied to this motor by a potential proportional to the speed of this motor. In case the motor should overrun on a decreasing signal, an increased voltage will be supplied from the speed measuring bridge which will additionally oppose the signal otherwise supplied and reduce its effective value. The output from the speed measuring bridge may include a component produced by the back E. M. F. from the bank control motor on overrunning. As the signal otherwise supplied approaches zero, the speed responsive component will, in case of overrunning, assume relatively thereto a large value and may actually exceed the other signal to supply a reverse effective signal which positively brakes the bank control motor. In any case where the speed control motor is moving to produce a signal from the speed bridge circuit, if the signal otherwise supplied is zero, the speed bridge signal will supply a braking E. M. F. through the bank motor amplifier to the bank control motor which immediately arrests its movement. In this way the movement of the bank control motor is immediately arrested when the turn control motor speed measuring bridge and the bank control motor follow-up potentiometer have equal and opposite outputs.

The operating circuits for the elevator control motor 40 are shown in Figs. 5 and 6. The operation of this motor is in many respects similar to that of the turn control motor.

The positional information for controlling the vertical flight path component is derived from a glide path receiver 38. As is well known, this receiver is utilized in connection with a radio transmitter having a radiation pattern providing a path of constant intensity along which the aircraft is guided. The course defined by the glide path transmitter is utilized to bring the aircraft into a landing. The guide path transmitter is modulated at an audio frequency.

As is usual, the output from the glide path receiver is rectified and operates the horizontal needle of the cross-pointer instrument 7 as shown in Fig. 6. The receiver supplies a small D. C. voltage which is generally dependent upon the altitude of the aircraft. Low pass filter 182 is provided to remove frequency components which might interfere with the operation of the elevator control motor. When the aircraft is on the desired course the output of the receiver has a definite value, and when the aircraft departs vertically from the course the receiver output increases or decreases in dependency on the direction of the departure. This output from the glide path receiver is supplied to terminals 131 and 132 as shown in Fig. 6 which are connectable with the input terminals 133 and 134 of the elevator control circuit shown in Fig. 5.

In order to obtain a positional signal which reverses its sign in dependency on which side of the course the aircraft is, I provide resistance 135 connected to terminal 134. This resistance is in series with the output circuit from the glide path receiver and is shunted by battery 136 and rheostat 137. The current from battery 136 is employed to set up a potential over resistance 135 opposing the output from the glide path receiver so that the effective input to the elevator control circuit will be zero when the aircraft is on course, and which will change its sign depending upon whether the aircraft is above or below the course.

These circuit components in combination with the glide path receiver supply the elevator control amplifier with a positional signal entirely similar to that supplied the bank control amplifier by the rectified input from the range receiver. The elevator control motor 40 similarly operates potentiometer 42 to supply a follow-up voltage in combination with battery 138, rheostat 139, and center tapped resistor 140. The resultant signal from the combined position signal and follow-up voltage is supplied by conductors 141 and 142 to vibrator arm 143 which is operated by actuator coil 144 energized by the A. C. supply from terminals 145. The A. C. supply is rectified to form a series of pulses for operating the vibrator 143 by half wave rectifier 146. Thus, the D. C. signal is modulated at the frequency of the A. C. supply.

The elevator control amplifier receives its input through transformer 147 and comprises resistance coupled tubes 148, 149 and 150 and push-pull output tubes 151 and 152. Its output is coupled to field coil 153 of the elevator control motor by transformer 154. The other field coil 155 of the elevator control motor is energized by the A. C. supply through conductors 156 and 157.

The operation of this amplifier is in all respects similar to that of the turn control amplifier, with the exception of the operation of the elevator control motor speed measuring bridge which includes field coil 153 and resistance 158 as one pair of arms and inductance 159 and resistances 160 and 161 as the other pair. In order to prevent hunting of the aircraft about the course defined by the glide path transmitter, the output from this speed measuring bridge is introduced into the elevator control amplifier at control grid 162 of tube 149. The function of this speed responsive signal is in all respects similar to that of the signal produced by the bank motor speed bridge, and it therefore prevents overrunning of the elevator control motor 40 and consequent hunting.

As described in connection with Fig. 2, the elevator control motor is operatively connected to the automatic pilot and by operation thereof controls the angle of climb or descent of the aircraft. The directional correction in the vertical plane caused by operation of the elevator control motor 40 is measured by the output from follow-up potentiometer 42 operated by the motor, and the input to the elevator control amplifier becomes zero when this voltage is equal and opposite to the positional signal measuring the vertical departure from course. The elevator motor speed measuring bridge is effective to prevent overrunning of the motor and hunting of the aircraft about the desired direction in the vertical plane.

In order to accomplish directional corrections proportional to the rate of change of departure in a vertical direction from course, I employ circuit components for superimposing on the positional signal a component proportional to its rate of change. These are illustrated in Fig. 6, and for the purposes of illustration a different circuit has been shown from that employed with range receiver 5 for controlling the heading of the aircraft.

The output from the glide path receiver is connected by conductors 164 and 165 to a bridge circuit comprising resistances 166 and 167 and mutually coupled inductances 168 and 169. The output from the bridge circuit is supplied to terminals 131 and 132 through conductors 170 and 171. It will be understood that in a steady-state condition inductances 168 and 169 effectively shunt the output received at terminals 131 and 132; but that they oppose a proportionately increasing resistance on a rising signal to increase the output relative to their action in a steady-state condition; and generate an opposing voltage on a decreasing signal to reduce the output relative to their action in a steady-state condition. The bridge therefore superimposes on the positional signal a component proportional to its rate of change, and the resulting signal supplied at terminals 131 and 132 causes the elevator control motor to correct the direction of the plane in proportion to the rate of change of departure in the vertical relative to the course defined by the glide path transmitter.

It will be understood that in landing the automatic vertical control of the aircraft should be immediately terminated on contact of the aircraft with the ground either automatically or by a manual control operable by the pilot. For this purpose switch 178 is provided in conductor 157 for deenergizing the field coil 155 of the elevator control motor 40.

In accordance with the above description it will be understood that the invention contemplates the completely automatic control of the flight of an aircraft in dependency on positional information derived from radio signals. Under operation of my system the aircraft is automatically guided to maintain the desired course. The system is similarly designed to automatically land an aircraft, which operation is automatically carried out without requiring any manual control dependent upon the personal judgment of the pilot.

Whereas it is desirable to employ the complete system, under certain circumstances only certain components thereof need be utilized. For instance, my turn control unit either with or without the bank control unit may be employed in instances where it is unnecessary to maintain an automatic control of the altitude of the aircraft. Similarly, the altitude control unit may be used alone, where automatic control of turn and bank of the aircraft is not desired. It is clear that the operating principles of my system are not restricted in any way to the specific circuits described, but may be utilized in other embodiments.

What is claimed is:

1. In a control system for dirigible craft, electric motor means controlling the direction of movement of the craft, control circuit means for the motor means operative in response to a directional displacement signal to cause operation of the motor means, and further control means for the motor means connected for receiving said displacement signal and operative to correct a portion of the same to supply a time derivative signal to said control circuit means to brake the motor means on overrunning following decreasing effective value of said displacement signal.

2. In an aircraft flight control system, electric motor means operative to control the heading of the aircraft, control circuit means for the motor means for receiving a control signal responsive to change in position of the aircraft, follow-up control means for the motor means responsive to the operation of the motor means connected for supplying a follow-up signal to said control circuit means, and anti-hunting control means for the motor means responsive to the rate of operation of the motor means also connected to said control circuit means.

3. In an aircraft flight control system, in combination, electric motor means operative to control the direction of flight of the aircraft, signal input circuit means controlling operation of the motor means for receiving an input control signal voltage, follow-up means operated by the motor means operative to supply a voltage to the signal input circuit means opposing the input control signal voltage, and means responsive to the speed of the motor means operative to supply a speed voltage to the signal input circuit for preventing hunting of the aircraft about its desired line of flight.

4. In an aircraft flight control system, in combination, electrically operated motor means operative to control the direction of flight of the aircraft, control circuit means for the electrically operated motor means adapted to receive a control signal for controlling operation of the motor means, follow-up means operated by said motor means for supplying a signal for counteracting said control signal, and means connected to said motor means and becoming operative upon the effective control signal approaching zero to supply an anti-hunting signal to the control circuit means proportional to the speed of the motor means for braking the motor.

5. In an aircraft flight control system, position-responsive means for supplying a positional signal proportional to the extent of departure of the aircraft from a course, motor means operative to control the direction of flight of the aircraft operating in dependency on the positional signal supplied by position-responsive means to return the aircraft to course, follow-up means operated by the motor means operative to supply a follow-up signal proportional to the operation of the motor means opposing the positional signal and balancing out said signal on operation of the motor means proportional to the positional signal, thereby controlling the operation of the motor means, and means operating in dependency on the speed of the motor means supplying a signal proportional to the speed of the motor means opposing the positional signal and operative to brake the motor means as the positional and follow-up signals approach balance.

6. In an aircraft flight control system, motor means operative to control the direction of flight of the aircraft, control means connected for controlling said motor means responsive to a signal proportional to the extent of departure and to the rate of departure of the aircraft from a course to cause the motor means to return the aircraft to course, follow-up control means connected for further controlling the motor means responsive to the operation of the motor means, and anti-hunting means connected for further controlling said motor means.

7. In an aircraft flight control system, motor means connected so as to be operative to control the direction of flight of the aircraft, a control circuit for said motor means responsive to departures of said aircraft from course and to a time derivative thereof, and follow-up and anti-hunting control means for the motor means responsive to the operation and to the rate of operation of the motor means and connected for controlling said motor means.

8. In an aircraft flight control system, aircraft flight controlling motor means connected so as to be operative to control the direction of flight of the aircraft, and control means for the motor means responsive to change of direction and to rate of change of direction of the aircraft under operation of the motor means connected for controlling said motor means.

9. In an aircraft flight control system, in combination, motor means operative to control the direction of flight of the aircraft, a signal circuit, a motor controlling input circuit, a motor-movement responsive follow-up circuit, a motor speed responsive circuit, the signal circuit being connected with the motor controlling input circuit to cause actuation of the motor responsive to the signal, the motor-movement responsive circuit being connected to the input circuit to oppose the signal on actuation of the motor and operative to render the input circuit voltage from the signal and motor-movement responsive circuits zero on motor movement proportional to the signal, the motor speed responsive circuit being operative to supply the input circuit with a braking voltage to stop the motor when the voltage supplied to the input circuit by the signal and follow-up circuits is substantially zero and thereby prevent overrunning of the motor.

10. In an automatic navigational system for dirigible craft, electric steering motor means for controlling the steering of the craft, and control means for said steering motor means responsive to departure of the craft from a desired heading and to the first derivative of such departure with respect to time, and follow-back means responsive to operation of said steering motor means connected to said control means for modifying the action of said control means.

11. In an automatic navigational system for dirigible craft, a radio range receiver for producing an output signal responsive to departure of the craft from a desired radio course, means supplied with said signal for deriving from said output signal a signal responsive to the rate of change thereof, electric motor means for controlling the steering of the aircraft, and a control circuit for said motor connected to be responsive to said signals.

12. In an automatic navigational system for dirigible craft, a radio range receiver for producing an output signal responsive to departure of the craft from a desired radio course, means connected to said receiver for deriving from said output signal a signal responsive to the rate of change of said signal, electric motor means for controlling the steering of the aircraft responsive to said signals, means responsive to the speed of said motor means for producing a rate signal and additional electric motor means for controlling the banking of the aircraft connected to be responsive to the rate signal of said speed responsive means.

13. An automatic navigational system for dirigible craft as defined in claim 12, wherein means is provided responsive to the rate of operation of said banking motor means to substantially eliminate the hunting thereof.

14. In an automatic navigational control system for aircraft, a glide path radio receiver for producing an output voltage signal responsive to departure of the craft from a desired glide path, means connected in the output circuit of said receiver for taking a derivative of said output signal, and an elevator control motor for said aircraft having a control circuit connected to be responsive to said signal and its derivative.

15. An automatic navigational control system for aircraft as defined in claim 14, wherein anti-hunt means is provided for further controlling said elevator control motor responsive to the speed thereof, said anti-hunt means being connected in said motor control circuit.

16. In a navigational system, steering and aileron control motors, circuit means for producing a voltage varying with the speed of a motor having said steering control winding varying in effective impedance with change of motor speed, comprising a bridge circuit including said winding in one arm thereof, means for applying a control voltage to a pair of opposite bridge points of said circuit, and output connections to other bridge points thereof.

17. A navigational system as defined in claim 16, wherein means is provided for connecting said steering control motor for operating the aircraft rudder, and additional means, connected for operating the aircraft aileron control motor, connected to be controlled from said output connections, whereby the operation of said aileron control motor is proportional to the speed of said steering control motor.

18. In apparatus of the character described, a bridge circuit for deriving a derivative potential comprising resistances and mutually coupled inductances, said inductances serving to effectively shunt a supply potential connected to opposite bridge points during a steady state condition of the supply potential, said inductances offering an increasing resistance to a rising supply potential and generating an opposing voltage upon a decreasing supply potential, thereby superposing on the supply potential a component proportional to its rate of change, the output of said bridge being removable from the remaining opposite points thereof.

19. In apparatus for automatically steering a dirigible craft to follow a predetermined radio course, a receiver for producing a course signal, direction control means operable to alter the orientation of said craft about an axis, motive means connected to be responsive to said signal and operably connected to said direction-controlling means, additional direction control means operable to alter the orientation of said craft about an axis at right angles to said first axis, and second motive means connected to be responsive to the rate of operation of said first motive means operably connected to said additional control means.

20. Circuit means for obtaining a voltage dependent upon the speed of a motor having a winding varying in effective impedance with change of motor speed, comprising a bridge circuit including said winding in one arm thereof, means for applying an input to a pair of opposite bridge points of said circuit, output connections to conjugate bridge points thereof, and means for balancing said circuit at a predetermined motor speed, including zero speed.

21. Circuit means for obtaining an alternating voltage dependent upon the speed of a motor having a winding varying in effective impedance with change of motor speed, comprising an impedance bridge circuit including said winding in one arm thereof, means for applying an alternating electrical input to a pair of opposite bridge points of said circuit, output connections to conjugate bridge points thereof, and means for balancing said circuit at the frequency of said input and at zero or a predetermined motor speed.

22. Circuit means for obtaining a reversible phase alternating voltage dependent upon the speed and direction of operation of an alternating current motor having a winding varying in reactance as to magnitude and sign with variation of motor speed and direction of rotation respectively, comprising an impedance bridge including said winding in one arm thereof, means for applying an alternating electrical input to a pair of opposite bridge points of said circuit, output connections to conjugate bridge points thereof, and means for balancing said circuit at the frequency of said input and with said motor at standstill.

23. In an aircraft flight control system having a turn control motor for controlling the steering rudder of an aircraft, means operative by and with said turn control motor for producing a signal voltage proportional to the speed thereof, a bank control motor for controlling the ailerons, means producing a signal voltage proportional to the degree of bank of the aircraft, a control circuit connecting said signal voltages in opposition to produce a resultant voltage, and means for controlling said bank control motor from said resultant voltage.

24. The combination set forth in claim 23, having a third signal voltage producing means for producing a voltage proportional to the speed of said bank control motor for normally opposing said resultant voltage.

FRANCIS L. MOSELEY.

REFERENCES CITED

The following references are of record in the file of this patent:

UNITED STATES PATENTS

| Number | Name | Date |
|---|---|---|
| 1,896,805 | Sperry et al. | Feb. 7, 1933 |
| 2,102,141 | Wager | Dec. 14, 1937 |
| 2,105,598 | Hubbard | Jan. 18, 1938 |
| 2,115,086 | Riggs | Apr. 26, 1938 |
| 2,159,142 | Fisher | May 23, 1939 |
| 2,221,612 | Schaelchlin | Nov. 12, 1940 |
| 2,237,440 | Jones | Apr. 8, 1941 |
| 2,283,754 | Matthews | May 19, 1942 |

Certificate of Correction

Patent No. 2,496,809　　　　　　　　　　　　　　　　　　　February 7, 1950

FRANCIS L. MOSELEY

It is hereby certified that errors appear in the printed specification of the above numbered patent requiring correction as follows:

Column 10, line 62, for "shelf-induced" read *self-induced*; column 18, lines 20 and 21, for "of a motor having said steering control" read *of said steering control motor having a*;
and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*